D. W. KREBS.
GUARD FOR HENS' NESTS.
APPLICATION FILED FEB. 11, 1911.
1,044,193.
Patented Nov. 12, 1912.
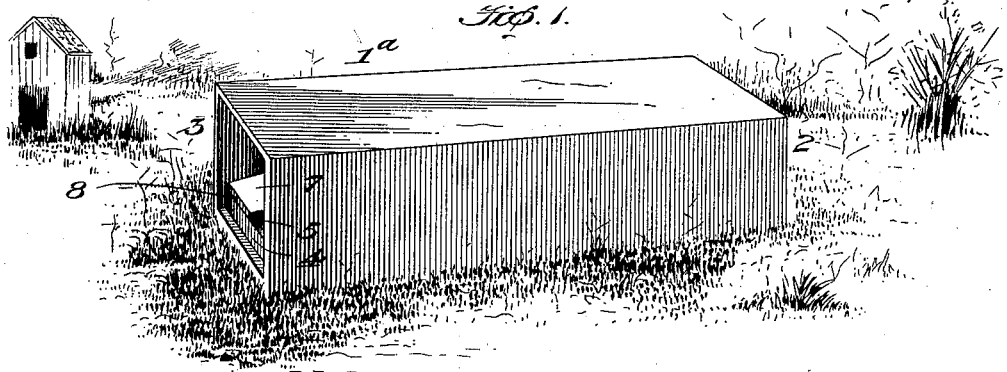

UNITED STATES PATENT OFFICE.

DANIEL W. KREBS, OF WATTS, CALIFORNIA.

GUARD FOR HENS' NESTS.

1,044,193.  Specification of Letters Patent.  Patented Nov. 12, 1912.

Application filed February 11, 1911. Serial No. 608,055.

*To all whom it may concern:*

Be it known that I, DANIEL W. KREBS, a citizen of the United States, residing at Watts, county of Los Angeles, and State of California, have invented certain new and useful Improvements in Guards for Hens' Nests, of which the following is a specification.

This invention relates to guards for hen nests.

The present invention has for its object the provision of a novel guard for hen nests which will be automatically and unconsciously operated by the hen when passing to the nest to close the entrance thereto so that other fowls may not have access to the nest while it is occupied, the device being adapted for actuation by the hen when leaving the nest to displace the guard so that she may pass out, and in this connection the invention contemplates, further, the provision of a guard which will, when closed, define a sight opening to guide the hen in leaving the nest.

The invention is fully set forth hereinafter and the novel features are recited in the appended claim.

In the accompanying drawings: Figure 1 is a perspective view showing the guard closed; Fig. 2, a longitudinal section showing the guard closed as when the nest is in use; and Fig. 3, a similar view showing the position of the parts when the nest is ready for occupancy.

The nest may be provided as a part of the present invention, or, the guard constituting the present invention may be separately constructed and adapted for attachment to any nest. The form first mentioned is shown in the drawings.

The nest 1, having wall 2 may be in any suitable box-like structure permanently attached to or detachably connected to the box-like structure 1ª which constitutes the entrance or alley to the nest, the structure 1ª being open at 3 and there preferably provided with a raised ledge 4. Pivoted within and to the side walls of the structure 1ª near the top thereof, on suitable pivots 6 is a trap door or guard 7 whose outer end 8 is notched at 5 and adapted to rest upon the part 4 when the door is closed and thus guard or bar the entrance to the nest but permit the admission of light through the opening 5 which may be provided either in the door or in the part 4.

At 8ª is shown a treadle which is provided with ears 9 pivoted at 10 to the box-like entrance 1ª and positioned adjacent the entrance 2 to the nest so that the hen will step upon this treadle when entering or passing from the nest. Secured to the treadle is a lever 11 which is connected to a link 12 in turn pivoted at 13 to the door 7. The lever 11 and link 12 may be of suitable stiff wire if desired.

When the nest is ready for use the door 7 is in the elevated position shown in Fig. 3. The hen entering at 3 passes through the box-like structure 1ª and steps on the end B of the treadle and thence into the nest, her weight causing the treadle to tilt to the position shown in Fig. 2, whereupon the connections 11 and 12 pull down the door 7 so that it rests upon the part 4, thus guarding the entrance to the nest, but on account of the provision of the said opening 5, the hen can always see the light and when leaving the nest will walk toward it and in consequence as she steps on the end A of the treadle, the latter is restored to its ordinary position and the door 7 is raised, permitting the fowl to pass out through the opening 3.

With my invention the interference of hens, endeavoring to sit on the same nest, is entirely obviated.

The present invention has the advantage that when it is to be used in an established henery, it is not necessary to remove the nests already built or to rebuild them, as with other inventions, as the present invention can be readily attached to nests already in use and does not interfere with or cause eggs to be broken or jarred, as is the case with those inventions where the nest is pivotally or tiltably mounted and operates the door.

Various modifications can be resorted to in carrying out the invention and the disclosures herein are to be deemed as illustrative, rather than restrictive, of the invention.

Having thus described my invention, what I claim as new and desire to secure by Letters Patent, is:—

In a guard for hen nests, the combination with an alley through which the hen must pass in order to gain access to the nest, of a swinging drop door operating wholly within the alley, a treadle independent of the nest, adapted to be rocked one way or the other and to remain where positioned by the hen, according as the hen is going to or passing from the nest, and a direct articulated connection between the treadle and the door constituting the sole operating means for the door and adapted to positively operate the door in both directions.

In testimony whereof, I hereunto affix my signature in presence of two witnesses.

DANIEL W. KREBS.

Witnesses:
F. M. ANDERSON,
L. L. BLACKMAN.

Copies of this patent may be obtained for five cents each, by addressing the "Commissioner of Patents, Washington, D. C."